(12) United States Patent
Dey et al.

(10) Patent No.: US 10,796,097 B2
(45) Date of Patent: Oct. 6, 2020

(54) SYSTEM AND METHOD FOR EVENT PROFILING

(71) Applicant: Tata Consultancy Services Limited, Mumbai (IN)

(72) Inventors: Lipika Dey, Gurgaon (IN); Tirthankar Dasgupta, Kolkatta (IN); Priyankar Ghosh, Kolkatta (IN); Anjan Dutta, Kolkatta (IN); Abir Naskar, Kolkatta (IN); Rupsa Saha, Kolkatta (IN)

(73) Assignee: Tata Consultancy Services Limited, Mumbai (IN)

(*) Notice: Subject to any disclaimer, the term of this patent is extended or adjusted under 35 U.S.C. 154(b) by 153 days.

(21) Appl. No.: 16/110,490

(22) Filed: Aug. 23, 2018

(65) Prior Publication Data

US 2019/0065467 A1  Feb. 28, 2019

(30) Foreign Application Priority Data

Aug. 23, 2017 (IN) .............................. 201721029896

(51) Int. Cl.
| | |
|---|---|
| G06F 40/30 | (2020.01) |
| G06F 16/28 | (2019.01) |
| G06F 40/253 | (2020.01) |
| G06F 40/295 | (2020.01) |
| G06N 20/00 | (2019.01) |

(52) U.S. Cl.
CPC ............ *G06F 40/30* (2020.01); *G06F 16/285* (2019.01); *G06F 40/253* (2020.01); *G06F 40/295* (2020.01); *G06N 20/00* (2019.01)

(58) Field of Classification Search
CPC combination set(s) only.
See application file for complete search history.

(56) References Cited

U.S. PATENT DOCUMENTS

2017/0116054 A1* 4/2017 Boddhu ................. G06F 9/542
2017/0357716 A1* 12/2017 Bellegarda .......... G06F 16/3329

OTHER PUBLICATIONS

Rani, M. et al. (Aug. 2017). "Semi-Automatic Terminology Ontology Learning Based on Topic Modeling," *Engineering Applications of Artificial Intelligence*, vol. 63; pp. 108-125.
Qazi, N. et al. (Jan. 2017). "Applying Data Science to Criminal Intelligence Analysis," *VALCRI White Paper Series*; 13 pages.
(Continued)

*Primary Examiner* — Abul K Azad
(74) *Attorney, Agent, or Firm* — Finnegan, Henderson, Farabow, Garrett & Dunner, LLP

(57) ABSTRACT

System and method for method and system for event profiling is described that processes large volume of data gathered from a plurality of digital sources to automatically profile and continuously update an event. The system utilizes, an ensemble of probabilistic classifiers for automated extraction of finer details of the event, which use linguistic features for profiling information about the event, wherein the information is spread across various data sources. Further, disambiguation is performed to augment the accuracy of the event profiling. The system enables semantically linking of related events curated in the knowledge base and thereby performs semantic search over it. The system takes user-feedback and improves upon the information extraction process through reinforcement learning.

9 Claims, 8 Drawing Sheets

(56) References Cited

OTHER PUBLICATIONS

Bhatt, M. et al. (Jun. 2009). "Ontology driven semantic profiling and retrieval in medical information systems," *Web Semantics: Science, Services and Agents on the World Wide Web*, vol. 7; pp. 317-331.

Arulanandam, R. et al. (Jan. 2014). "Extracting Crime Information from Online Newspaper Articles," *Proceedings of the Second Australasian Web Conference (AWC 2014)*, Auckland, New Zealand; pp. 31-38.

* cited by examiner

G1
1) Indrani plotted murder in London, Skyped driver SRC2, DATE5
2) Sheena Bora murder: Indrani Mukerjea wanted to kill her two children, ex-driver testifies SRC3, DATE4

G2
3) Indrani Mukherjea to be interrogated in connection with Byculla prison inmate's death SRC1, DATE2
4) Indrani to be interrogated in Manjula Shete Byculla jail murder case: Maharashtra minister SRC2, DATE2

G3
5) Rohtak gangrape-murder: Victim's brother found murdered in Sonepat SRC1, DATE2
6) High court grants bail trio in Mohsin Shaikh murder case SRC1, DATE1

G4
7) Shaikh murder: prosecution moves court to quash HRS chief Desai's provisional bail plea SRC2, DATE3
8) Mohsin Shaikh Murder: Family Hopeful as Rohini Salian Agrees to Be Special Public Prosecutor SRC2, DATE1

FIG. 2B

SYSTEM AND METHOD FOR EVENT PROFILING

CROSS-REFERENCE TO RELATED APPLICATIONS AND PRIORITY

Description

This application takes priority from the Indian filed application no. 201721029896 filed on 23 Aug. 2017 the entirety of which is hereby incorporated by reference.

TECHNICAL FIELD

The embodiments herein generally relate to data processing, and more particularly to data processing for event profiling.

BACKGROUND

In the field of text processing, event profiling is a process of gathering information relevant to a particular topic or event from multiple sources and storing them for easy future reference. Generally, the event profiling can be performed either manually or as an automated process. In the manual event profiling process, profiling experts can be engaged in gathering, filing, cleaning and compiling reliable information for different categories of end consumers. The automated event profiling of information from multiple textual sources is an emerging field in the field of text processing.

Conventionally, keyword based approaches are used for automated event profiling. But the keyword based approaches are facing challenges to handle finer nuances of natural language reporting and therefore are often unable to contextually interpret and extract the correct details. Additionally, the present automatic event profiling methods face challenges in ensuring verifiability of information, reliability of information sources and handling factual variations or contradictions.

SUMMARY

Embodiments of the present disclosure present technological improvements as solutions to one or more of the above-mentioned technical problems recognized by the inventors in conventional systems.

In an aspect, there is provided a processor implemented method for event profiling, the method comprising receiving, by one or more hardware processors, a set of articles for the event profiling of an event from one or more data sources, wherein the set of articles are multilingual. Further, aggregating, by the one or more hardware processors, the set of articles to obtain a plurality of groups with each group comprising a plurality of news related to a common event information component, wherein the plurality of news are aggregated across date, sources of information and languages. Further, analyzing, by the one or more hardware processors, the plurality of groups to identify relevant linguistic features corresponding to each group among the plurality of groups by utilizing a set of language specific Natural Language Processors (NLPs) to obtain an analyzed data set. Further, classifying, by a plurality of classifying agents implemented by the one or more hardware processors, the plurality of groups identified with the relevant linguistic features as class members of a plurality of classes, wherein each class among the plurality of classes is identified by a unique event related factor, wherein the plurality of classifying agents are language specific classifiers. Furthermore, disambiguating, by the one or more hardware processors, class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class. Furthermore, analyzing, by the one or more hardware processors, the disambiguated data set to obtain linked information for data in the disambiguated data set. Furthermore, updating an event ontology in an ontology knowledge base using the linked information, wherein a semi-supervised technique is utilized for incremental updation of the event ontology.

In another aspect, there is provided a system comprising: one or more data storage devices operatively coupled to the one or more processors and configured to store instructions configured for execution by the one or more processors to receive a set of articles for the event profiling of an event from one or more data sources, wherein the set of articles are multilingual; aggregate the set of articles to obtain a plurality of groups with each group comprising a plurality of news related to a common event information component, wherein the plurality of news are aggregated across date, sources of information and languages; analyze the plurality of groups to identify relevant linguistic features corresponding to each group among the plurality of groups by utilizing a set of language specific Natural Language Processors (NLPs) to obtain an analyzed data set; classify the plurality of groups identified with the relevant linguistic features as class members of a plurality of classes, wherein each class among the plurality of classes is identified by a unique event related factor, wherein the step of classifying is performed by a plurality of classifying agents that are language specific classifiers; disambiguate class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class; analyze the disambiguated data set to obtain linked information for data in the disambiguated data set; and update an event ontology in an event ontology knowledge base using the linked information, wherein a semi-supervised technique is utilized for incremental updation of the event ontology.

In yet another aspect, there is provided a computer program product comprising a non-transitory computer readable medium having a computer readable program embodied therein, wherein the computer readable program, when executed on a computing device, causes the computing device to receive a set of articles for the event profiling of an event from one or more data sources, wherein the set of articles are multilingual; aggregate the set of articles to obtain a plurality of groups with each group comprising a plurality of news related to a common event information component, wherein the plurality of news are aggregated across date, sources of information and languages; analyze the plurality of groups to identify relevant linguistic features corresponding to each group among the plurality of groups by utilizing a set of language specific Natural Language Processors (NLPs) to obtain an analyzed data set; classify by a plurality of classifying agents the plurality of groups identified with the relevant linguistic features as class members of a plurality of classes, wherein each class among the plurality of classes is identified by a unique event related factor, wherein the plurality of classifying agents are language specific classifiers; disambiguate class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class; analyze the disambiguated data set to obtain linked information for data in the disambiguated data set; and update an event ontology in an event ontology knowledge base using the linked information, wherein a semi-supervised technique is utilized for incremental updation of the event ontology.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2B illustrates intermediate output of an event profiling unit of system of FIG. 1 post aggregation of an example set of articles into a plurality of groups, in accordance with an embodiment of the present disclosure.

DETAILED DESCRIPTION OF EMBODIMENTS

Figure 1:
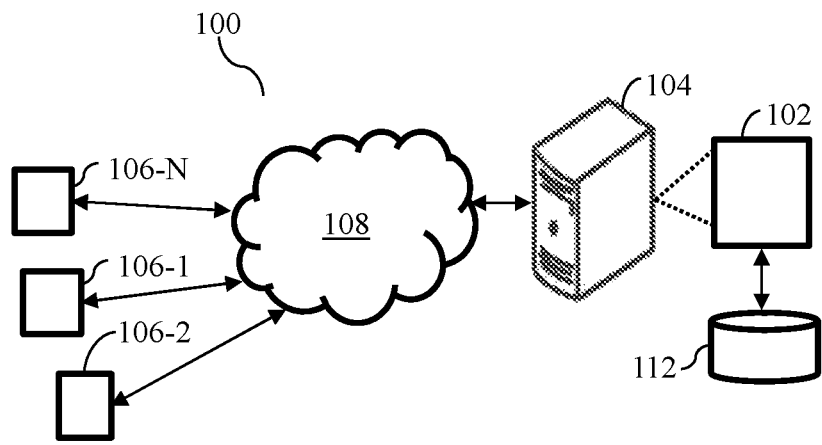
FIG. 1 illustrates a networking environment implementing a system for event profiling, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Natural language processing techniques for event profiling from articles extracted from digital data sources such as published News articles from internet is an area of research and development. An event may refer a crime event, sports event, natural calamity, safety incident, disaster incident and the like. The articles from different sources regularly report a set of events containing a set of event details including, information about a set of entities associated with the set of events, details of the set of events and other related information. The set of event details may not be published together. In certain circumstances, the set of event details may refer to a plurality of past events. Identifying an event from the set of events as at least one of a new event and an old event and extracting the set of event details is a challenging task. Conventional automated event profiling methods face challenges in ensuring verifiability of information, reliability of information sources and handling factual variations or contradictions. Moreover, incremental compiling of facts from sources generated over a period of time also needs efficient entity resolution and linking mechanisms to ensure information continuity.

Various embodiments of the present disclosure provide method and system for event profiling. Here, an ensemble of probabilistic classifiers are used for automated extraction of finer details of the event. Here, the ensemble of probabilistic classifiers use linguistic features for profiling information about the event, wherein the information is spread across various data sources. Further, disambiguates can be used to augment the accuracy of the event profiling. The system and method disclosed provides complete automated event profiling ensuring verifiability of information, reliability of information sources and handling factual variations or contradictions. Moreover, incremental compiling of facts from sources generated over a period of time is also handled providing efficient entity resolution and linking mechanisms to ensure information continuity. Further, the information collected is not limited to any language and sources of information are crawled without language barriers. This enables the system to capture all possible variations and details in information related to an event, say crime, which may be hidden in local news and not rightly captured in common used News languages world-wide, such as English.

The system throughout the description is explained with the crime event as an example, but should not be construed as a limitation.

Referring now to the drawings, and more particularly to FIG. 1 through FIG. 8 where similar reference characters denote corresponding features consistently throughout the figures, there are shown preferred embodiments and these embodiments are described in the context of the following exemplary system and/or method.

FIG. 1 illustrates a network environment 100 implementing a system 102 for event profiling, in accordance with an embodiment of the present disclosure. The system 102 is configured to receive a set of articles for the event profiling of an event from one or more data sources. The set of articles are multilingual not restricting to any specific language or source. The set of articles, also referred as digital documents, include digitally published News articles, microblogs, content from social media and the like. The system 102 may be embodied in a computing device, for instance a computing device 104.

As depicted in FIG. 1, the present disclosure is explained with the system 102 implemented on a server. However, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2A.

Figure 2A:
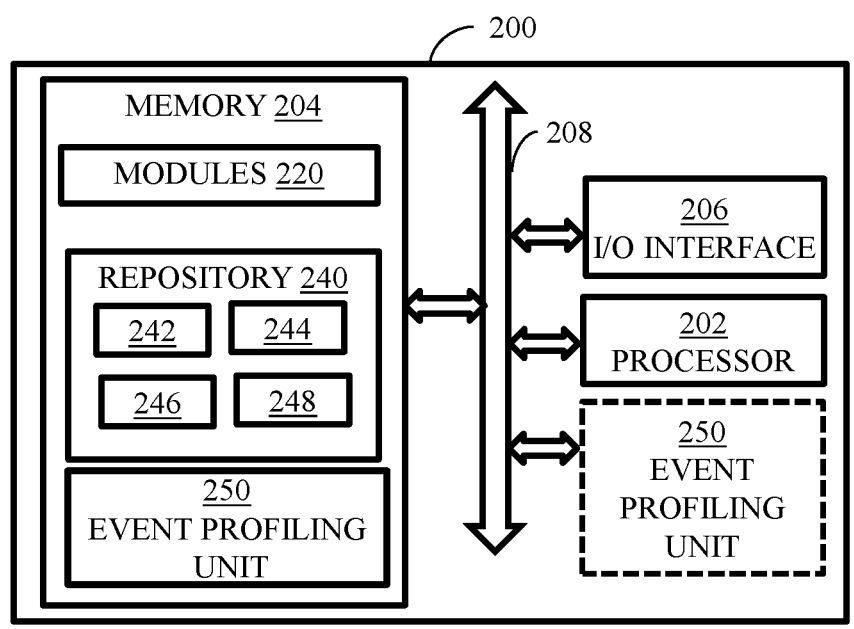
FIG. 2A illustrates a block diagram of the system of FIG. 1 for event profiling, in accordance with an embodiment of the present disclosure.
Figure 3:
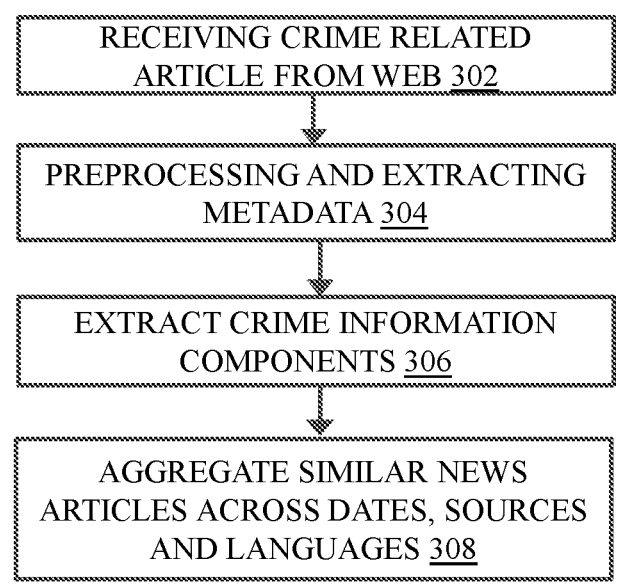
FIG. 3 illustrates an example flow diagram for multilingual document aggregation, in accordance with an embodiment of the present disclosure.

FIG. 2A illustrates a block diagram of a system 200 for event profiling, in accordance with an embodiment of the present disclosure. The system for event profiling 200 (hereinafter referred to as system 200) may be an example of the system 102 (FIG. 1). In an example embodiment, the system 200 may be embodied in, or is in direct communication with the system, for example the system 102 (FIG. 1). The system 200 includes or is otherwise in communication with one or more hardware processors such as a processor 202, at least one memory such as a memory 204, and an I/O interface 206 and an event profiling unit 250. In an embodiment, the event profiling unit 250 can be implemented as a standalone unit in the system 200. In another embodiment, event profiling unit 250 can be implemented as a module in the memory 204. The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 200 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 (one or more hardware processors) may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

Figure 8:
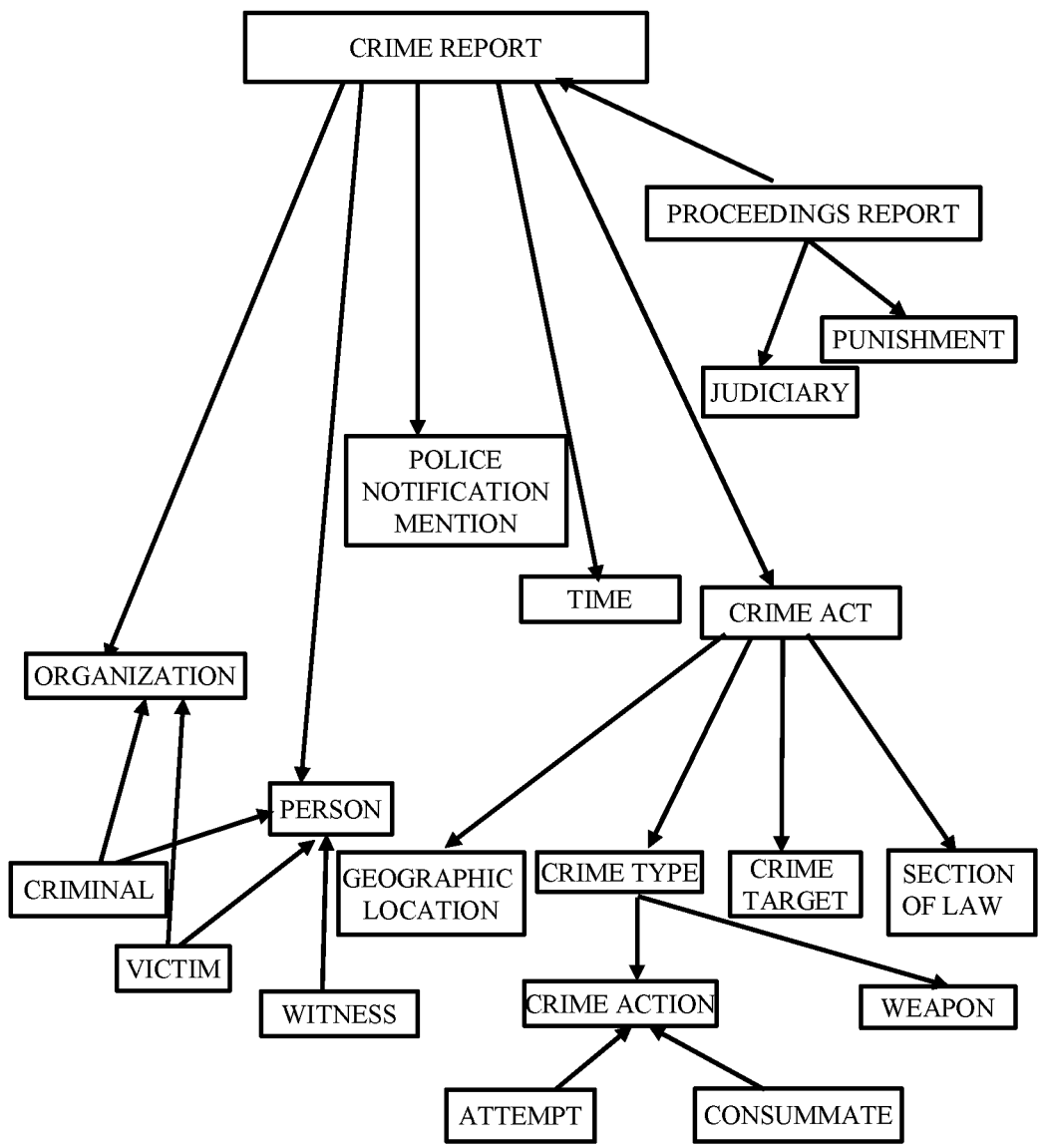
FIG. 8 illustrates an example crime ontology knowledgebase, in accordance with an embodiment of the present disclosure.

The repository 240, amongst other things, includes a system database 242 and other data 244. The other data 244 may include data generated as a result of the execution of one or more modules in the modules 220. The repository 240 is further configured to maintain a plurality of event ontologies. For example, the event can be a crime and an example crime ontology knowledge base is as shown in FIG. 8. Initially, a crime related ontological knowledge base has been collected from one or more digital sources. The one or more digital sources includes WikiCrimes, WordNet®, legal resources, and a subset of the news resources. Further, a semi-supervised learning technique has been used to enhance the existing ontology. Here, the ontology knowledge base has been initiated with a few seed concepts and then expanded by utilizing a set of knowledge inferred from other resources. Further, a set of terms and phrases, following concepts linguistically similar to the seed concepts has been included in the ontology knowledgebase. Table 1 depicts some of the seed concepts related to different type of crime information. Apart from using the semi-supervised technique of ontology extension, a set of ontology inference rules are used to obtain better semantic representation of a domain. For example, a "Crime Target" concept may have the type man, woman or a child. On the other hand, "Child Abuse" is a type of "Sex Crime". Hence, an inference rule can be constructed. For example, the inference rule can be "if the crime type is of "Child Abuse" then the "Crime Target" will be of the type "Child"". Similarly, if the "Crime Type" is "Sexual Assault" then there is a high chance of the "Crime Target" to be of type "Woman". In an embodiment, the inference rules were constructed using first order logic. In another embodiment, the inference rules can be obtained using more generalized frameworks like, Owl and SPARQL.

TABLE 1

| Crime Factors | Seed concepts | Extended concepts |
| --- | --- | --- |
| Crime Nature | Assault | Aggravated assault, injury, injury, attack |
| | Fraud | Embezzlement, credit-theft, counterfeit |
| Criminal | Abuser | Murderer, brutal, violent |
| Victim | Assaulted | Suffered, forced, coerced |
| Law Enforcement | Arrest | Custody, interrogation, jail, investigated |
| | Raid | Seize, arrest, police, squad |

The event profiling unit 250 of the system 200 can be configured to receive a set of articles for the event profiling of an event from one or more data sources. The set of articles are multilingual not specific to any particular language. The event, for example herein is a crime event, thus event may be interchangeably referred as crime or crime event. Similarly the event ontology may be interchangeably referred as crime ontology with regards to description herein for crime profiling. In an embodiment, the one or more articles can be a set of crime News articles. In an embodiment, the set of news digitized News articles can be received from a set of digital sources. In another embodiment, a site specific document crawler can be used to receive the set of digitized News articles.

Upon receiving the set of articles, the event profiling unit 250 of the system 200 can be configured to aggregate set of articles to obtain a plurality of groups. Each group, so aggregated, comprises a plurality of news related to an event information component, for example herein crime information component as depicted in table 2A, 2B and 2C below.

The term plurality of news refers to all received or noteworthy information associated with the event information component, from any digital source.

The plurality of news are aggregated across date, sources of information and languages and the like. A method of aggregating the set of articles is further explained with reference to FIG. 3 for the crime event. Now referring to FIG. 3, the set of articles are crawled (302) are pre-processed (304) and a set of metadata associated with the set of articles are extracted. Further, a set of crime information components are extracted (306) from a set of articles by utilizing the metadata. Further, a plurality of similar news from the set of articles are aggregated (308) across on date, sources of information and languages.

TABLE 2A

| Crime components | Extraction Techniques |
| --- | --- |
| Crime type | Linguistic pattern learning and Dictionary based |
| Crime location | location entity extraction, linguistic pattern learning, and ontological reasoning |
| Crime date and time | Temporal Entity extraction and linguistic pattern learning |
| Criminal name | Named Entity extraction and linguistic pattern learning |
| Booking under section | Ontology based and Linguistic pattern learning |
| Judge | Named Entity extraction and pattern learning |
| Judiciary Date/Time | Temporal Entity extraction and pattern learning |

TABLE 2B

| Crime components | Extraction Techniques |
| --- | --- |
| Accused Name* | Named Entity extraction and pattern learning |
| Accused Sex | pattern learning |
| Accused Age | pattern learning |
| Victim Name* | Named Entity extraction and pattern learning |
| Victim Sex | pattern learning |
| Victim Age | pattern learning |
| Accused Lawyer | Named Entity extraction and pattern learning |

TABLE 2C

| Crime components | Extraction Techniques |
| --- | --- |
| Law Enforcement | Named Entity extraction and pattern learning |
| Arrest Location | location entity extraction and pattern learning |
| Judiciary Location | location entity extraction and pattern learning |
| Arrest Date/Time | Temporal Entity extraction and pattern learning |
| Action taken | Pattern learning |
| Booked under section* | Pattern learning |
| Court order | Pattern learning |
| Punishment | Pattern learning |

An example of aggregation of the set of articles is provided below:

A: Received Set of Articles:
1. Indrani Mukherjea to be interrogated in connection with Byculla prison inmate's death SRC1, DATE2
2. High court grants bail trio in Mohsin Shaikh murder case SRC1, DATE1
3. Indrani plotted murder in London, Skyped driver SRC2, DATE5
4. Sheena Bora murder: Indrani wanted to kill her two children, ex-driver testifies SRC3, DATE4
5. Rohtak gangrape-murder: Victim's brother found murdered in Sonepat SRC1, DATE2
6. Shaikh murder: prosecution moves court to quash HRS chief Desai's provisional bail plea SRC2, DATE3
7. Mohsin Shaikh Murder: Family Hopeful as Rohini Salian Agrees to Be Special Public Prosecutor SRC2, DATE1
8. Indrani Mukerjea to be interrogated in Manjula Shete Byculla jail murder case: Maharashtra minister SRC2, DATE2

B: Aggregated the set of articles into a plurality of groups (G1, G2 and G3), with each group comprising a plurality of news related to an event information component identified for the group. FIG. 2B illustrates an intermediate output of the event profiling unit 250, post aggregation of the set of articles into a plurality of groups in accordance with an embodiment of the present disclosure.

Further, the event profiling unit 250 of the event profiling system 200 can be configured to analyse the plurality of groups to identify relevant linguistic features corresponding to each group among the plurality of groups. The identification of relevant linguistic features is based on a set of language specific Natural Language Processors (NLPs) to obtain an analysed data set by analysing each news article in each group. The set of NLPs can be applied to extract relevant linguistic features from the aggregated articles.

Further, the Table 3 below provides language detection using the set of language specific NLP analysers.

TABLE 3

| Source | date | news | Language |
|---|---|---|---|
| s1 | d2 | 1) Indrani Mukherjea to be interrogated in connection with Byculla prison inmate's death | English |
| s1 | d1 | 2) High court grants bail trio in Mohsin Shaikh murder case | English |
| s2 | d5 | 3) Indrani plotted murder in London, Skyped driver | English |
| s3 | d4 | 4) Sheena Bora murder: Indrani wanted to kill her two children, ex-driver testifies | English |
| s1 | d2 | Rohtak gangrape-murder: Victim's brother found murdered in Sonepat | English |
| s4 | d2 | 5) शीतयोग हत्याकांड में सरकारी गवाह बने इंद्राणी मुखर्जी के ड्राइवर श्यामवर राय ने शुक्रवार को कुछ खुलासे किए। ... | Hindi |
| s4 | d2 | 6) आगरा के ठीकी थाना क्षेत्र में शुक्रवार की लोगों ने एक बुजुर्ग महिला को पीट-पीटकर मार डाला।... | Hindi |
| s5 | d2 | 7) শুক্রবার রাতেও থানা থেকে পিছা বর হয়ে মাধ্যমিক অফিসের ইঞ্জিনী মুখার্জীরদেয়া সামনে পুলিশ ঘাঁটির করেন তাঁর ছেলেন মিখাইলকে। | Bengali |

The set of NLP analysers includes a pre-processor, a dependency based syntactic parser, a morphological analyser, a Named Entity Recognizer (NER), a pronoun resolver and an entity resolver. In an embodiment, the pre-processor extracts from the plurality of news in each group a set of raw news text and a set of headlines of the set of raw news from one or more web pages. The set of headlines are retained since it may contain relevant information about the event. Additionally, the set of headlines are used to narrow down a search in case, body of the extracted text mentions one or more events or people. Further, the pre-processor removes all Hypertext Markup Language (HTML) tags and foreign language characters from the extracted text.

In an embodiment, the dependency parser, for example, a Stanford parser, performs Part-Of-Speech (POS) tagging and syntactic processing on the pre-processed data. The POS Tagger is a piece of software tool to read the pre-processed data and assigns parts of speech to each functional and content words, including noun, pronoun, verb, adjective, adverbs. Additionally, the POS tagging tokenizes the pre-processed data and labels each word with the corresponding POS. From the output of the POS tagger, root verbs are extracted and passed to the morphological analyser to identify the tense, aspect and modality of the root verb. The Stanford parser is used to extract different dependency relations within a set of pre-processed sentences. A set of dependency features associated with the Stanford dependency parser includes adverbial clause modifier, auxiliary, negation modifier, marker, referent, open clausal complement, clausal complement, expletive, coordination, passive auxiliary, nominal subject, direct object, and copula, conjunct.

In an embodiment, the NER is utilized to perform named entity extraction and resolution. For example, a named entity extractor can be a Stanford NER. The Stanford NER extracts a set of named entities. For example, the set of entities can be at least one of "Person" and "Organization", "Location", "Date", "Time", "Money" and "Percent". In an embodiment, the set of named entities extracted and resolved includes "Person" and "Organization", "Location", "Date", "Time". The dependency parsed text along with the named entity tags are then passed through a co-reference resolver. A Stanford Deterministic Co-reference Resolution System, implements a multi-pass sieve algorithm, is used via the Stanford CoreNLP tool suite. In addition to the standard Stanford Deterministic Co-reference Resolution System, an extra layer of multiple passes is added. The additional layer can modify the raw text whenever a co-referenced phrase gets resolved. Further, the modified text is sent in as a fresh input to the co-reference module, until no further changes to the input text are detected.

Result of Named Entity Recognition Algorithm for Example a News Articles with Named Entities in Bold Font Below:

The body of Manju Sharma (66) was found with injury marks on her head and face at her residence-cum-nursing home yesterday, Sub Inspector Naresh Kumar said. The doctor's son Deepak, yesterday tried to contact his mother over the phone, but got no response. When a police team visited Dr. Sharma's residence, they found her dead, said the SI.

In an embodiment, the entity resolver resolves a set of different entity names obtained from the NER, which is an iterative process as shown for example below:

Iteration 1. The body of Manju Sharma (66) was found with injury marks on her head and face at her residence-cum-nursing home yesterday, Sub Inspector Naresh Kumar said. The doctor's son Deepak, yesterday tried to contact his mother over the phone, but got no response. When a police team visited Dr. Sharma's residence, they found her dead, said the SI.

Iteration 2. The body of Manju Sharma (66) was found with injury marks on her head and face at her residence-cum-nursing home yesterday, Sub Inspector Naresh Kumar said. The doctor's son Deepak, yesterday tried to contact his mother over the phone, but got no response. When a police team visited Manju Sharma's residence, they found her dead, said the SI.

Iteration 3. The body of Manju Sharma (66) was found with injury marks on her head and face at her residence-cum-nursing home yesterday, Sub Inspector Naresh Kumar said. The doctor's son Deepak, yesterday tried to contact his mother over the phone, but got no response. When a police team visited Manju Sharma's residence, they found her dead, said the Sub Inspector Naresh Kumar.

Thus, Dr. Sharma is identified in second Iteration and Manju Sharma, while SI is identified to be abbreviation for Sub-Inspector in third iteration and the named entities are resolved.

In another example, various abbreviations of a person (e.g., "Tom Hayes" as "Mr. Hays") or organization name (e.g., "Kosovo Liberation Army" as "KLA") should be identified for better understanding of the given information. Further, the entity resolver can automatically extract the abbreviations of entities by utilizing a mutual information based statistical learning method. The basic intuition of the present disclosure is that a named entity and its abbreviations tend to appear in adjacent sentences. The said co-occurrence could appear frequently in a corpus. Further, a Bigram Mutual Information (BMI) measure, a variant of the standard mutual information (MI) measure has been extended to conduct statistical inference for the abbreviations of business entities. The BMI between two entity ti, tj can be measured as shown in equation 1.

$$BMI(t_i, t_j) = \alpha \cdot Pr(t_i, t_j) * \log_2\left(\frac{Pr(t_i, t_j)}{Pr(t_i)Pr(t_j)}\right) - (1 - \alpha) \quad (1)$$

-continued $$\left[Pr(t_i, \neg t_j) * \log_2\left(\frac{Pr(t_i, \neg t_j)}{Pr(t_i)Pr(\neg t_j)}\right) + Pr(\neg t_i, t_j) * \log_2\left(\frac{Pr(\neg t_i, t_j)}{Pr(\neg t_i)Pr(t_j)}\right)\right]$$

Where, an abbreviation extractor BMI (ti, tj) is a function to "infer" the statistical association between two terms $t_i$ and $t_j$. In the present disclosure, one of the terms is the seeding business full name. A parameter $\alpha \in [0, 1]$ was used to adjust a relative weight of positive and negative evidence respectively. $P_r(t_i, t_j)$ is the joint probability that both terms appear in a text window, and $P_r(t_i)$ is the probability that a term $t_i$ appears in a text window. Apart from the above BMI measure, a set of rules that are specifically applied to certain special cases. In particular, for the case of person Named Entity, the following cases are taken care of:

Case 1: Full Name and Partial Name: e.g. "John Brown's conviction was overturned." and "Brown says he knows only two things." For this, if one of the entity is a substring of the other, the longer one is the resolved version of the shorter.

Case 2: Same Name with Different Prefixes: e.g., "Senator Ahmed Ibrahim Lawan had won an election." and "Mr. Ibrahim Lawan was attending a meeting." In this case, known salutations (e.g., Mr., Dr., Mrs., Judge, and Senator) are ignored, then if one entity is substring of the other, they can be resolved to the longer entity.

Case 3: Full Name and Shortened Name: e.g., "The conviction of Thomas Hames comes in a different time." and "T. Hames was one of the seven people present." In this instance, each entity is tokenized into words, and if they have at least one whole word matching with other words matching in their first letter, they are taken to be the same entity.

In an embodiment, an algorithm to perform final entity resolution is as given below:

```
Input: List of Named Entities: NE
Output: Dictionary of Resolved Entities: NE_Res
    NE_Res = [ ]
    for (each entity N in NE | N not in NE_Res ) do
        create new dictionary entry for key N in NE_Res
        for (each entity N_oth in NE | N_oth not in NE_Res do
            if N_oth can be resolved to N then
                add N_oth to NE_Res as a value to key N
            end if
        end for
    end for
    return NE_Res
```

In an embodiment, an explanation of the above mentioned algorithm can be described as below: Let NE be a list of entities. Initially, an empty dictionary (NE Res) are created to hold a set of resolved entities. Further, an entity N from the NE, is selected. Here, the entity N is not available in the dictionary NE Res. Further, the entity N can be selected as a key to NE Res, and removed from the list. The above steps are iterated for each remaining entity (N Oth) from the list of entities. If the N Oth can be resolved to be the same physical entity as N, the N Oth is added as a value against key N in the dictionary. At the same time N Oth is removed from the original list NE. Finally, a dictionary is obtained to provide a list of named entities. Here, the dictionary includes a set of names referring to the same entity among the list of entities.

The event profiling unit 250 of the system 200 can be configured to classify by a plurality of classifying agents implemented by the one or more hardware processors 202, the plurality of groups identified with the relevant linguistic features into class members of a plurality of classes. Each class among the plurality of classes is identified by a unique event related factor, wherein the classification utilizes a plurality of language specific classifiers. The classifier used are set of language specific classifiers to obtain a set of classified data. For example, a Support Vector Machine (SVM) based classifier can be used. Initially, an annotated corpus was prepared where the event related seed concepts are labelled. Further, a set of new crime related concepts are learnt by considering all the related words, co-occurring with the seed concepts as a set of features. The features we use an SVM based classifier that classifies unknown words into any of the below four event related factors, for example in case of crime event, crime related factors, namely, "Nature of crime", "Criminal", "Victim", "Enforcement" news. Given a training set instance-class pairs $(x_i, y_i)$, i=1, 2, . . . , I, where xi∈Rn is the feature space and y∈1,−1I is the label space, the general equation of a Support Vector machine (SVM) is as shown in equation 2 and equation 3.

$$\frac{1}{2}\vec{W}^T\vec{W} + C\sum_{i}^{l}(\zeta_i) \text{ is minimized} \quad (2)$$

$$y_i(W^T + \emptyset(\vec{x}_i) + b) \geq 1 - \zeta_i, \zeta_i(slack variable) \geq 0 \quad (3)$$

In an embodiment, the SVM is implemented using the LIBSVM software. The LIBSVM is an open source Library for Support Vector Machines. The present disclosure has been tested with a linear kernel on the data. The classification module learns each of the above linguistic features from an example training sample of 3000 texts collected from various online sources.

The event profiling unit 250 of the event profiling system 200 can be configured to disambiguate by the one or more hardware processors 202, class membership of each class member of the plurality of classes to obtain a disambiguated data set, wherein the disambiguation is performed based on voting among the plurality of classifying agents for the class of each class member, relationship validity among each class member and corresponding class and relationship validity among each class member and remaining other class members of the class. The method implemented by system 200 for disambiguation of the set of classified data is explained with reference to FIG. 6, which is performed by a trained diambiguator implemented by the one or more hardware processors 202. The training of the disambiguator is explained with reference to FIG. 5.

Figure 5:
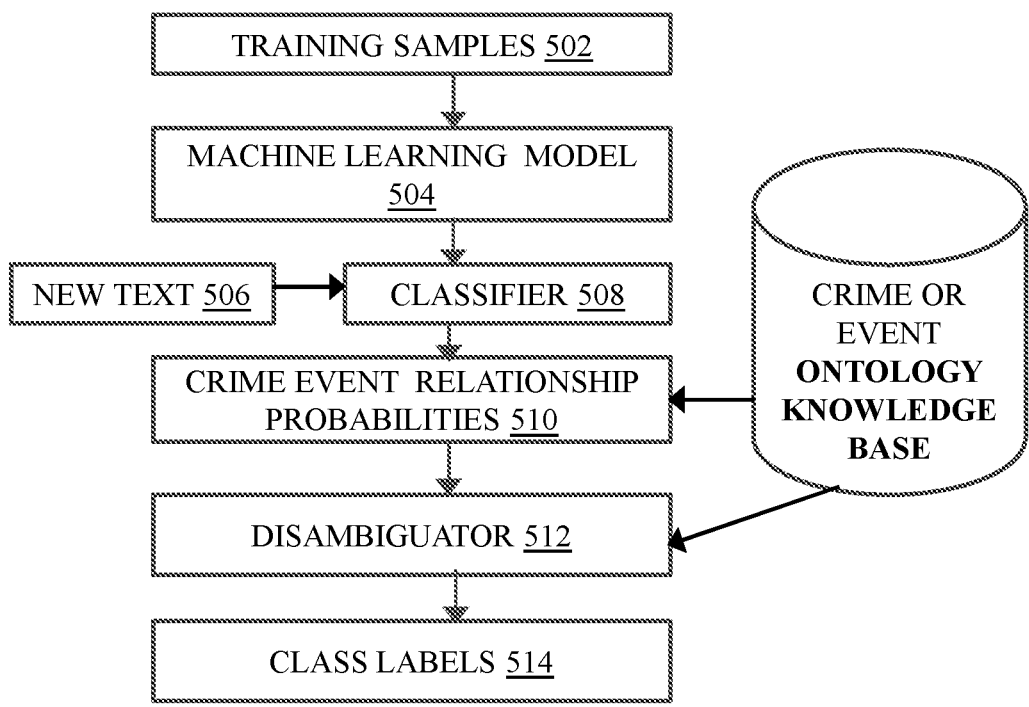
FIG. 5 illustrates an example flow diagram for training a disambiguator, in accordance with an embodiment of the present disclosure.

Now referring to crime event example of FIG. 5, a set of input training samples are given (at step 502) to a machine learning model. The machine learning model (at step 504) is used to classify the input text by utilizing a set of classifiers (at step 508). The set of classifiers can predict a set of crime components available in input text (506). Now, depending upon the input text 506, a classifier among the set of classifiers may fail to predict the one or more crime components. At step 510, crime event relationship probabilities are calculated for training the disambiguator at step 512 for the class labels 514. It is also observed that the output of the classifier may be ambiguous. For example, the ambiguity can be due to assigning same crime component to one or more crime component class. For example, consider the following text segment:

"Multiple teams of Gandhinagar police's local crime branch (LCB) arrested Shailesh Patel, one of the two prime accused in the Navin Shah kidnapping-murder case, and also seized the SUV in which the murder took place. Shah, 69, was director of printing of Navneet Education and was killed in a moving car on July 25 on SG Road. The LCB officials said that Patel was caught when he went to the spot where he had parked his another car used in the crime on Prantij-Himmatnagar Road. According to the LCB officials, four teams, led by inspector J D Purohit and sub-inspectors H K Solanki, K A Patel and S B Padheriya, are working on the case. After the arrest of two accused—Jignesh Bhaysar and Ramesh Patel—by Ahmedabad city crime branch, LCB seized a car parked by Shailesh Patel outside Devnarayan Dhaba, a roadside eatery, on Monday."

In an embodiment, a classifier among the set of classifiers may predict both Shailesh Patel and Navin Shah as "Accuse Name" incorrectly, instead of predicting Shailesh Patel as "Accuse Name" and Navin Shah as "Victim Name". Further, the classifier can wrongly classify J D Purohit and H K Solanki as "Victim Name" instead of "law enforcement". In order to resolve said ambiguous predictions, the disambiguator can be utilized. The disambiguator works in three steps.

Step-1: receive a set of linguistic structures and lexical patterns and assign a probabilistic score to each of the predicted crime components.

Step-2: establish a semantic representation of the extracted crime components by utilizing a domain specific crime ontology and a reasoning framework associated with the domain specific crime ontology.

Step-3: Perform classification by utilizing the set of classifiers and ensemble a set of prediction scores. Further, select a score based on a majority voting method.

Figure 6:
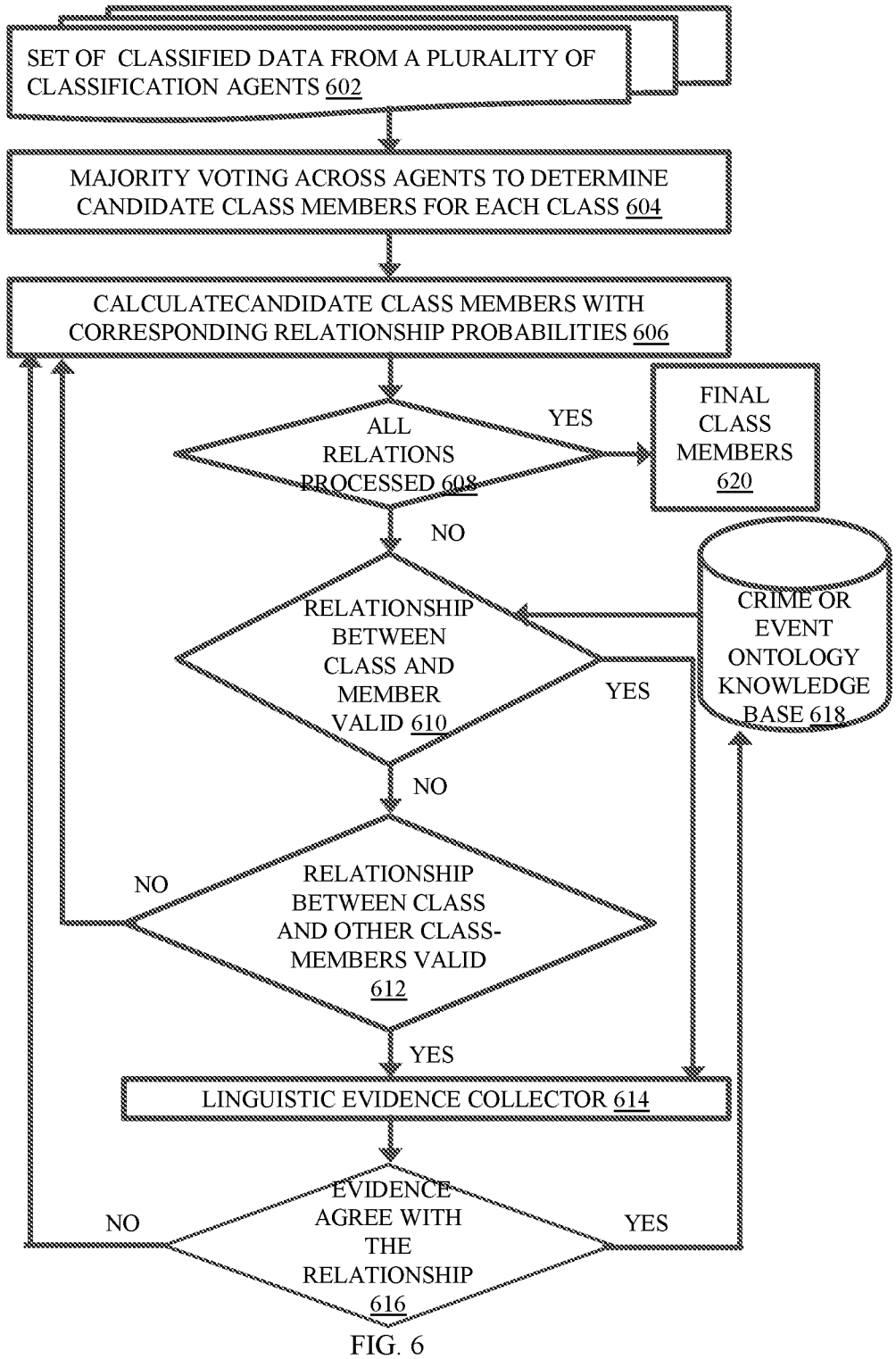
FIG. 6 illustrates an example flow diagram for disambiguation, in accordance with an embodiment of the present disclosure.

Now referring to FIG. 6, the set of classified data are received (at step 602) from the plurality of classification agents associated with the set of classifiers. Further, a majority voting is performed (at step 604) among the plurality of classifying agents to determine a candidate class associated with a class member. Further, relationship probabilities associated with the class member is calculated (at step 606). Further, a relationship between an identified class and the identified member of the class is checked (at step 608) for validity and the step 608 is repeated till final class members are identified (as in step 620). During each iteration, if the relationship is valid (at step 610), the class member is given to linguistic evidence collector (at step 614), else, the relationship between the class and the other class member is checked for validity (at step 612). If it is valid, it is given to linguistic evidence collector at step (614), else, the relationship probabilities are calculated again at step (606). Further, at step (616) it is assessed whether the collected evidence agree with the relationship of the class member. If the evidence agree with the relationship, the class member and the relationship is updated in the crime ontology knowledgebase (at step 618), otherwise the relationship probabilities are calculated again and the process in repeated until all the relationships among the class members are processed and the final class members are identified (at step 620)

The event profiling unit 250 of the event profiling system 200 can be configured to analyse, by the one or more hardware processors, the disambiguated data set to obtain linked information for data in the disambiguated data set. An information linker, explained herein for crime event profiling, implemented by one or more hardware processors handles multi-lingual sources, applies transliteration for Named Entities, applies machine translation for information other than Named Entities and performs linking of documents using cosine and jaccard similarity on Crime Information Components.

The analysis and linking of the set of classified data includes (i) identification of "nature of a crime" and "action taken" and (ii) identification of "accused name", "location of crime", "date of crime".

In an embodiment, identification of "nature of a crime" and "action taken" can be performed as given below: Interaction of the extracted text with the ontology knowledge base is used to identify patterns that are likely to indicate the Nature of the Crime committed. It is difficult to attach a level of confidence to the obtained information in this case, because, a crime often differs by geography. However, given the documents being processed exclusively talk of crime, if a term matches a crime pattern, it is an illegal activity. Further, the knowledge base is also employed to find occurrence of legal/law-enforcement related patterns across the whole document. Taking into account the presence of a story flow in a news document, paragraphs with higher density of candidate patterns have a higher confidence of describing the action taken in response to the crime.

In an embodiment, identification of "accused name", "location of crime", "and date of crime" can be performed as given below: The ontology knowledge base is used to label the terms present in a processed sentence. Labels are assigned on the basis of relevancy of a term to one of the three categories (Location, Date and Accused and Victim Name) with respect to the features obtained previously. Given a named entity occurring in a sentence, and one of the terms labelled as relevant in the same sentence, a distance between the two entities in the dependency graph is computed. In case either one or both of the named entity and the term is a phrase, the minimum distance between the two is considered. If N and T be two phrases in a sentence, a set of sub graphs $N_g$, $T_g$ are calculated corresponding to N and T respectively. Further, the distance can be calculated using equation 4. from the sentence dependency graph.

$$\text{dist}(N,T) = \min(d(x,y)), \text{where } x \in N_g, y \in T_g \quad (4)$$

Where, d(x,y) is minimum distance between two nodes x, y on a graph named entities which occur in Named Entity-Term pairs with distance below a certain threshold are considered to be candidate entities. The determination of confidence on the candidate entities is done over the whole document. Having collected all candidate NETerm pairs in the document, the named entities are resolved among themselves, to combine different expression of the same entity. The higher the number of NE-Term pairs a resolved entity participates in, the higher the confidence on that entity. This procedure is followed for three of the features, Accused Name, Location of Crime, and Date of Crime, with three different classes of named entities, i.e. Person, Location and Date, respectively. Further, evaluation of crime factor using different classifiers are as given in table 4.

TABLE 4

|  | Accused Name | Nature of crime | Location | Date |
|---|---|---|---|---|
| Precision | 93 | 71 | 89 | 87 |
| Recall | 49 | 74 | 87 | 88 |
| F-Measure | 64 | 72 | 88 | 87 |

In an embodiment, a method to determine the accused name is as shown below:

```
Input: News Document on Crime: D;
Output: A set of Accused Name candidates in decreasing order
   of confidence: C
KB = Knowledge Base
Candidates=[ ]
for each sentence S in D do
    P = POS tags of S
    DT = dependency tree of S
    PE = all named entities tagged as person in S
    CT = all terms in S indicated by KB for presence of
       accused for each entity N in PE do
           for each term T in CT do
               d = dist(N,T)
               if d < threshold then
                   add (N,T) to Candidates
               end if
           end for
       end for
end for
PERes = resolve_entities(N ∀ N ∈ Candidates)
Candidatesr esolved =[ ]
for each pair (N,T) in Candidates do
    (Nr ,T)←replace N with its key Nr from PERes
    add (Nr ,T) to Candidatesr esolved
end forconf=[ ]
for each unique entity Nr in Candidatesr esolved do
    cntNr ←number of (Nr ,T) in Candidatesr esolved
    add (Nr , cntNr ) to conf
end for
C = conf ordered with decreasing cntNr
return C
```

Figure 7:
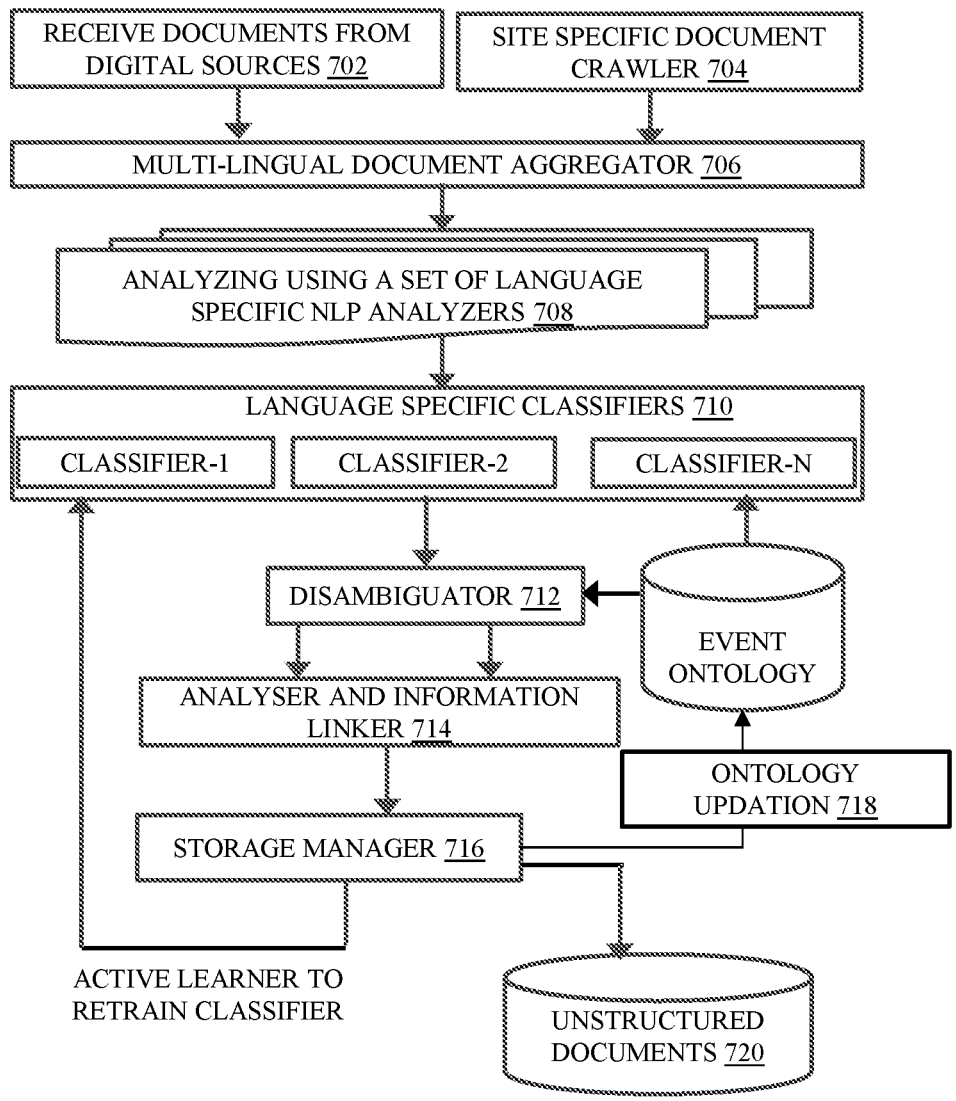
FIG. 7 is an example flow diagram illustrating a method for event profiling implemented by system of FIG. 1, in accordance with an embodiment of the present disclosure.

FIG. 7, with reference to FIG. 1 through FIG. 6, illustrates an example flow diagram of the method for event profiling, according to some embodiments of the present disclosure. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communication network. The order in which the method is described is not intended to be construed as a limitation, and any number of the described method blocks can be combined in any order to implement the method, or an alternative method. Furthermore, the method can be implemented in any suitable hardware, software, firmware, or combination thereof.

At step (702) and (704), the method includes, receiving by one or more hardware processors 201, the set of articles for the event profiling of an event from one or more data sources, wherein the set of articles are multilingual. At step 702 set of articles received are all documents from digital sources and at step 704 the set of articles received are through site specific document crawlers. At step 706, the method includes aggregating, by the one or more hardware processors 202, the set of articles to obtain the plurality of groups with each group comprising a plurality of news related to a common event information component, wherein the plurality of news articles are aggregated across date, sources of information and languages. At step 706, the method includes analysing, by the one or more hardware processors 202, the plurality of groups to identify relevant linguistic features corresponding to each group among the plurality of groups by utilizing a set of language specific Natural Language Processors (NLPs) to obtain an analysed data set. At step 710 the method includes classifying, by the plurality of classifying agents implemented by the one or more hardware processors 202, the plurality of groups identified with the relevant linguistic features into class members of the plurality of classes, wherein each class among the plurality of classes is identified by the unique event related factor. The classification utilizes a plurality of language specific classifiers. At step 712, the method includes disambiguating, by the one or more hardware processors 202, class membership of each class member of the plurality of classes to obtain the disambiguated data set. The disambiguation is performed based on voting among the plurality of classifying agents for the class of each class member, relationship validity among each class member and corresponding class and relationship validity among each class member and remaining other class members of the class. At step 714, the method includes analysing, by the one or more hardware processors 202, the disambiguated data set to obtain linked information for data in the disambiguated data set. At step 718, the method includes updating the event ontology in an ontology knowledge base using the linked information, wherein a semi-supervised technique is utilized for incremental updating of the event ontology. The storage manger 716 stores the linked information, which is then shared with language specific classifiers for continuous learning.

Figure 4:
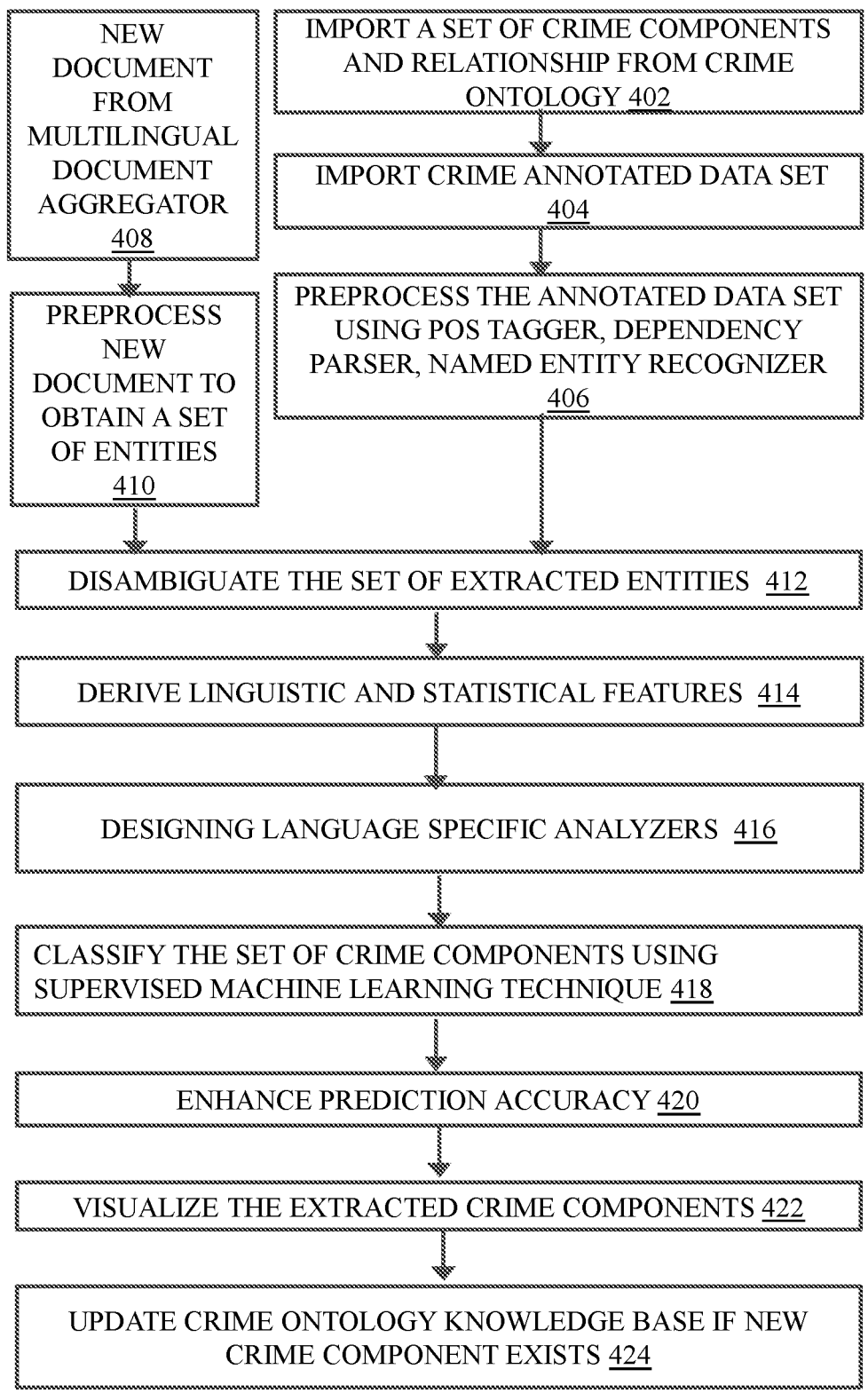
FIG. 4 illustrates an example flow diagram to extract new crime information, in accordance with an embodiment of the present disclosure.

In an embodiment, a crime information extraction method is explained with reference to FIG. 4. Now referring to FIG. 4, initially, at step 402, a set of crime components and a relationship associated with the set of crime components are imported form the crime ontology. Here, the crime components includes Name of the accused, Name of the Victim, Nature of Crime, Action taken, Crime location. At step 404, a crime annotated data set is imported from the set of crime components. At step 406, the annotated data set is pre-processed using the POS tagger, the dependency parser and the named entity recognizer. At step 408, a new document is received from the multilingual document aggregator. At step 410, the new document is pre-processed to obtain a set of named entities. At step 412, the set of entities are disambiguated. At step 414, the linguistic and statistical features associated with the disambiguated entities are obtained. At step 416, language specific analysers are designed. At step 418, the set of crime components are classified by utilizing a supervised machine learning technique to obtain a set of extracted crime components. The supervised machine learning techniques includes Conditional Random Field (CRF), Support Vector Machine (SVM), and Long-Short Term Memory (LSTM). At step, 420, the prediction accuracy is enhanced and a new crime component may be identified. The methods for prediction accuracy utilizes a plurality of language specific components including minimum dependency distance, linguistic patterns and ontology based disambiguation techniques. An example disambiguation technique is as shown in FIG. 6. At step 422, the set of extracted crime components are visualized. At step 424, the crime ontology knowledgebase is updated if there is any new crime component is identified.

In an embodiment, a sample crime information can be as shown below:

"Multiple teams of Gandhinagar police's local crime branch (LCB) arrested Shailesh Patel, one of the two prime accused in the Navin Shah kidnapping-murder case, and also seized the SUV in which the murder took place. Shah, 69, was director of printing of Navneet Education and was killed in a moving car on July 25 on SG Road. The LCB officials said that Patel was caught when he went to the spot where he had parked his another car used in the crime on Prantij-Himmatnagar Road. According to the LCB officials, four teams, led by inspector J D Purohit and sub-inspectors H K Solanki, K A Patel and S B Padheriya, are working on the case. After the arrest of two accused—Jignesh Bhaysar and Ramesh Patel—by Ahmedabad city crime branch, LCB seized a car parked by Shailesh Patel outside Devnarayan Dhaba, a roadside eatery, on Monday."

Further, the identified named entities are underlined as shown below:

"Multiple teams of Gandhinagar police's local crime branch (LCB) arrested Shailesh Patel, one of the two prime accused in the Navin Shah kidnapping-murder case, and also seized the SUV in which the murder took place. Shah, 69, was director of printing of Navneet Education and was killed in a moving car on July 25 on SG Road. The LCB officials said that Patel was caught when he went to the spot where he had parked his another car used in the crime on Prantii-Himmatnaaar Road. According to the LCB officials, four teams, led by inspector J D Purohit and sub-inspectors H K Solanki, K A Patel and S B Padheriva, are working on the case. After the arrest of two accused—Jignesh Bhaysar and Ramesh Patel—by Ahmedabad city crime branch, LCB seized a car parked by Shailesh Patel outside Devnarayan Dhaba, a roadside eatery, on Monday."

In the present disclosure, the set of multilingual news articles are extracted from a plurality of digital sources. Further, the crime related information has been extracted based on computational linguistic based methods. Further the crime related information is classified based on the set of classifiers. Further, the classified data is disambiguated and visualized. Finally, the event ontology knowledgebase has been updated. The method of disambiguation of the present disclosure along with supervised learning techniques and continuous updating of the ontology knowledgebase increases accurate prediction for event profiling. In crime news, it often happens that new allegations/facts/evidences come into the news at different times. When a new information arrives, we determine whether it refers to an existing case or a new case. If it is of an existing case, the case is updated accordingly. This is an ongoing process.

Sometimes it is possible that even though information is related to an existing case, the information itself constitutes of a new criminal case altogether. In such a scenario, a new entry is made in the ontology.

The final output provided by the system 200 can be a Crime register, composed of information related to different aspects of a crime, as made available to the end-user. All this information is represented in the back-end as a hierarchical semantic structure called the crime ontology.

Event profiling for multiple other domains and its analogy with crime event profiling explained throughout the description is provided below:

Example 1: Safety Incident Profiling

Elements of Interest: Incidence Location of Incidence
Date of Incidence
Document 1 (News)
Region 1 News Release: 10-205-BOS/BOS 2010-102 Tues., Mar. 9, 2010 Contact: Ted Fitzgerald Phone: 617-565-2074 AUGUSTA, Maine—The U.S. Department of Labor's Occupational Safety and Health Administration (OSHA) has cited Geneva Wood Fuels LLC for six alleged serious violations of workplace safety standards following an August 2009 explosion at the wood pellet manufacturing plant in Strong, Me. "Combustible dust is a real and potentially deadly presence in many types of workplaces," said William Coffin, OSHA's area director for Maine. "Employers should not assume this hazard is minor or non-existent. Addressing it requires ongoing attention and effort, but proper precautions can prevent or minimize the possibility of a devastating explosion or fire." Combustible dusts, including wood dust, are fine particles that present a potentially catastrophic explosion hazard when suspended in the air in certain conditions. Since 1980, more than 130 workers have been killed and 780 injured in combustible dust explosions in a variety of industries across the nation.

Document 2 (News)
On 26 Jun. 2007 at 0639 Western Standard Time, an Empresa Brasileira de Aeronautica S. A. EMB-120ER aircraft, registered VH-XUE, departed Perth, Wash. on a contracted passenger charter flight to Jundee Airstrip. There were two pilots, one flight attendant, and 28 passengers on the aircraft. While passing through 400 ft above ground level on final approach to Jundee Airstrip, with flaps 45 set, the aircraft drifted left of the runway centreline. When a go-around was initiated, the aircraft aggressively rolled and yawed left, causing the crew control difficulties. The crew did not immediately complete the go-around procedures. Normal aircraft control was regained when the landing gear was retracted about 3 minutes later.

Comparison with Crime Profiling
The NLP s remains the same.
The Entity Extraction and Resolution remains the same
Develop a Workplace Safety Ontology for Safety Incident Profiling, instead of Crime Ontology
The knowledge base for Safety Incidents focus on (a) Incidence (b) Location of Incidence (c) Date of Incident, instead of a) nature of crime, b) perpetrators/victim names, c) criminal names, and d) action taken SVM based classification model to learn concepts remains the same.

Usage
Collect and collate safety incident information. This can be used to analyze individual incidents, as well as review and update existing methods of ensuring safety across various domains.

Example 2: Disaster Incident Profiling

Elements of Interest:
Disaster IncidentTechnical Magnitude of Disaster Location of Disaster
Document 1 (News)
An earthquake with a magnitude of 6.2 has hit Indonesia's Lombok island, less than a week after a 6.9-magnitude tremor that is believed to have killed hundreds of people. Thursday's earthquake struck just after midday, sending panicked residents into the streets.

Document 2 (News)
California's biggest wildfire on record is expected to burn for the rest of the month, fire officials said on Tuesday, as hot and windy conditions challenged thousands of fire crews battling eight major blazes burning out of control across the state. The Mendocino Complex grew to span 1,176 sq km (454 sq miles) by Tuesday morning, with barely a third of it contained since two wildfires merged at the southern tip of the Mendocino national forest, the California Department of Forestry and Fire Protection (Cal Fire) said.

Comparison with Crime Profiling
The NLPs remain the same.
The Entity Extraction and Resolution remains the same
Develop a Disaster Ontology for Safety Incident Profiling, instead of Crime Ontology The knowledge base for Disasters focus on (a) Disaster Incident (b) Location of Disaster (c) Technical Magnitude of Disaster, instead of a) nature of crime, b) perpetrators/victim names, c) criminal names, and d) action taken,
SVM based classification model to learn concepts remains the same.
Usage
Analyze occurrences of disasters across the world over time.

The method and system described herein thus focuses on incremental extraction and summarization of domain specific information from multiple documents (set of articles), across different languages and published over an extended time period. The extracted information is gathered to generate reports and also support visualization and analysis of reported data. The extraction process provides following features:

a. It presents a Human-computer interface that can be used by an Human expert to define the information details that are to be extracted from News present in the set of articles
b. The Human Computer Interface also allows to plug in a domain Ontology that contains basic definitions of the different domain-related elements and associated events
c. Uses Deep NLP, and machine learning techniques for intelligent information extraction where the information pertains to different aspects of an event.
d. Summarize related information from multi-source and multi-lingual documents related to a given event
e. Extends the domain Ontology or existing Knowledge Base with new concepts that are extracted from text and deemed generic enough to be included as a part of the ontology
  I. It presents methods to reason with the extracted details using an established Domain Ontology and thereafter fill up a structured Knowledge base with all the relevant details under appropriate heads
f. It presents a method to extend an existing ontology to include novel events, entities and their relations that are reported in News articles
g. It presents methods to analyze a new incoming News article and link it to an earlier News article if the new article reports the progress of an event that was reported in the older article
h. It presents methods to thereby update the curated knowledge base with new and updated information
i. Maintains extracted information in a semi-structured manner for efficient information retrieval, visualization and analytics
  I. It presents methods to analyze the curated knowledge base and generate charts and reports related to crime in different regions, times etc.
j. It provides methods to semantically link related events curated in the knowledge base and thereby perform semantic search over it.
k. It takes user-feedback and improves upon the information extraction process through reinforcement learning.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for event profiling, the method comprising:
    receiving, by one or more hardware processors, a set of articles for the event profiling of an event from one or more data sources, wherein the set of articles are multilingual (702 and 704);
    aggregating, by the one or more hardware processors, the set of articles to obtain a plurality of groups with each group comprising a plurality of news related to a common event information component, wherein the plurality of news are aggregated across date, sources of information and languages (706);
    analysing, by the one or more hardware processors, the plurality of groups to identify relevant linguistic features corresponding to each group among the plurality of groups by utilizing a set of language specific Natural Language Processors (NLPs) to obtain an analysed data set (708);
    classifying, by a plurality of classifying agents implemented by the one or more hardware processors, the plurality of groups identified with the relevant linguistic features as class members of a plurality of classes, wherein each class among the plurality of classes is identified by a unique event related factor, wherein the plurality of classifying agents are language specific classifiers (710);
    disambiguating, by the one or more hardware processors, class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class (712);
    analyzing, by the one or more hardware processors, the disambiguated data set to obtain linked information for data in the disambiguated data set (714); and
    updating an event ontology in an ontology knowledge base using the linked information (718), wherein a semi-supervised technique is utilized for incremental updation of the event ontology.

2. The processor implemented method of claim 1, further comprising providing the updated event ontology to the plurality of language specific classifiers for continuous learning.

3. The processor implemented of claim 1, wherein the step of analyzing the plurality of groups to identify relevant linguistic features corresponding to each group among the plurality of groups by utilizing the set of language specific NLPs comprises:
    pre-processing the plurality of news of each group by a preprocessor of the set of language specific NLPs implemented by the one or more processors to:
        extract a set of raw news text and a set of headlines corresponding to the set of raw news text; and
        remove Hypertext Markup Language (HTML) tags and foreign language characters from the extracted set of raw news text,
    performing Part-Of-Speech (POS) tagging on the pre-processed set of news articles by a dependency parser of the set of language specific NLPs;
    extracting a root verb from the POS tagging;
    identifying tense, aspect and modality of the root verb by a morphological analyzer of the set of language specific NLPs; and
    performing named entity extraction and resolution to identify different entity names by a Named Entity Recognizer (NER) of the set of language specific NLPs, wherein an entity resolver resolves a set of different entity names obtained from the NER.

4. A system (200) for event profiling, the system (200) comprising a memory (204) operatively coupled to one or more hardware processors (202) and configured to store instructions configured for execution by the one or more hardware processors (202) to:
    receive a set of articles for the event profiling of an event from one or more data sources, wherein the set of articles are multilingual;
    aggregate the set of articles to obtain a plurality of groups with each group comprising a plurality of news related to a common event information component, wherein the plurality of news are aggregated across date, sources of information and languages;
    analyse the plurality of groups to identify relevant linguistic features corresponding to each group among the plurality of groups by utilizing a set of language specific Natural Language Processors (NLPs) to obtain an analysed data set;
    classify the plurality of groups identified with the relevant linguistic features as class members of a plurality of classes, wherein each class among the plurality of classes is identified by a unique event related factor, wherein the step of classifying is performed by a plurality of classifying agents that are language specific classifiers;
    disambiguate class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class;
    analyze the disambiguated data set to obtain linked information for data in the disambiguated data set; and
    update an event ontology in an event ontology knowledge base using the linked information, wherein a semi-supervised technique is utilized for incremental updation of the event ontology.

5. The system (200) of claim 4, wherein the system (200) is further configured to provide the updated event ontology to the plurality of language specific classifiers for continuous learning.

6. The system (200) of claim 4, wherein the system (200) is further configured to analyze the plurality of groups to identify relevant linguistic features corresponding to each group among the plurality of groups by utilizing the set of language specific NLPs, wherein the steps for analyzing comprise:
    pre-processing the plurality of news of each group by a preprocessor of the set of language specific NLPs implemented by the one or more processors to:

extract a set of raw news text and a set of headlines corresponding to the set of raw news text; and remove Hypertext Markup Language (HTML) tags and foreign language characters from the extracted set of raw news text, performing Part-Of-Speech (POS) tagging on the pre-processed set of news articles by a dependency parser of the set of language specific NLPs;

extracting a root verb from the POS tagging;

identifying tense, aspect and modality of the root verb by a morphological analyzer of the set of language specific NLPs; and performing named entity extraction and resolution to identify different entity names by a Named Entity Recognizer (NER) of the set of language specific NLPs, wherein an entity resolver resolves a set of different entity names obtained from the NER.

7. A computer program product (CPP) comprising a non-transitory computer readable medium having a computer readable program embodied therein, wherein the computer readable program, when executed on a computing device, causes the computing device to:

receive a set of articles for the event profiling of an event from one or more data sources, wherein the set of articles are multilingual;

aggregate the set of articles to obtain a plurality of groups with each group comprising a plurality of news related to a common event information component, wherein the plurality of news are aggregated across date, sources of information and languages;

analyse the plurality of groups to identify relevant linguistic features corresponding to each group among the plurality of groups by utilizing a set of language specific Natural Language Processors (NLPs) to obtain an analysed data set;

classify by a plurality of classifying agents the plurality of groups identified with the relevant linguistic features as class members of a plurality of classes, wherein each class among the plurality of classes is identified by a unique event related factor, wherein the plurality of classifying agents are language specific classifiers;

disambiguate class membership of each class member of the plurality of classes to obtain a disambiguated data set, wherein disambiguation is performed based on voting among the plurality of classifying agents for a class of each class member, relationship validity among each class member and corresponding class and relationship validity among each class member and remaining other class members of the class;

analyze the disambiguated data set to obtain linked information for data in the disambiguated data set; and update an event ontology in an event ontology knowledge base using the linked information, wherein a semi-supervised technique is utilized for incremental updation of the event ontology.

8. The CPP of claim 7, further causes the computing device to provide the updated event ontology to the plurality of language specific classifiers for continuous learning.

9. The CPP of claim 7, further causes the computing device to analyze the plurality of groups to identify relevant linguistic features corresponding to each group among the plurality of groups by utilizing the set of language specific NLPs by:

pre-processing the plurality of news of each group by a preprocessor of the set of language specific NLPs implemented by the one or more processors to:

extract a set of raw news text and a set of headlines corresponding to the set of raw news text; and remove Hypertext Markup Language (HTML) tags and foreign language characters from the extracted set of raw news text, performing Part-Of-Speech (POS) tagging on the pre-processed set of news articles by a dependency parser of the set of language specific NLPs;

extracting a root verb from the POS tagging;

identifying tense, aspect and modality of the root verb by a morphological analyser of the set of language specific NLPs; and performing named entity extraction and resolution to identify different entity names by a Named Entity Recognizer (NER) of the set of language specific NLPs, wherein an entity resolver resolves a set of different entity names obtained from the NER.

* * * * *